United States Patent [19]
Long et al.

[11] Patent Number: 5,862,890
[45] Date of Patent: *Jan. 26, 1999

[54] RESTRAINED AIRCRAFT BRAKE APPARATUS

[75] Inventors: Michael Allan Long, Long Beach; Wilfred Earl Boehringer, Fullerton; Carl Edward Trustee, Long Beach, all of Calif.

[73] Assignee: McDonnell Douglas Corporation, Huntington Beach, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 585,791

[22] Filed: Jan. 16, 1996

[51] Int. Cl.$^6$ .................................................... F16D 55/36
[52] U.S. Cl. ........................................ 188/71.5; 188/73.36
[58] Field of Search .............................. 188/71.5, 73.35, 188/73.36, 73.37, 218 A, 264 G, 18 A

[56] References Cited

U.S. PATENT DOCUMENTS

| | | |
|---|---|---|
| 2,875,855 | 3/1959 | Albright . |
| 3,357,519 | 12/1967 | Anderson et al. . |
| 3,368,653 | 2/1968 | Vander Veen . |
| 3,845,919 | 11/1974 | Jenny . |
| 4,290,505 | 9/1981 | Kramer ........................................ 188/18 |
| 4,383,594 | 5/1983 | Correll et al. ........................... 188/71.5 |
| 4,576,255 | 3/1986 | Méry et al. . |
| 4,944,370 | 7/1990 | Chambers et al. ....................... 188/71.5 |
| 5,062,503 | 11/1991 | Black et al. ............................. 188/71.5 |
| 5,107,968 | 4/1992 | Delpassand ............................... 188/264 |
| 5,143,184 | 9/1992 | Snyder et al. ................... 188/218 A X |
| 5,205,832 | 4/1993 | Edmisten ................................. 188/71.5 |
| 5,255,761 | 10/1993 | Zaremsky ................................. 188/71.5 |
| 5,323,881 | 6/1994 | Machen et al. .......................... 188/71.5 |
| 5,402,865 | 4/1995 | Harker . |
| 5,437,352 | 8/1995 | Harker ..................................... 188/71.5 |
| 5,485,898 | 1/1996 | Patko .............................. 188/264 G X |
| 5,494,138 | 12/1996 | Scelsi et al. ......................... 188/71.5 X |
| 5,540,305 | 7/1996 | Hammond et al. .............. 188/264 G X |

*Primary Examiner*—Robert J. Oberleitner
*Assistant Examiner*—Pamela J. Lipka
*Attorney, Agent, or Firm*—Bell Seltzer Intellectual Property Law Group of Alston & Bird, LLP

[57] ABSTRACT

Axial and rotational movement of the torque tube foot of an aircraft's disc brake assembly is restrained to substantially dampen or eliminate the short interval high frequency vibration previously experienced on brake application. Restraining means is employed to restrain the torque tube foot and includes an annular flange member mounted to the axle by an axle sleeve and positioned adjacent a first side of the torque tube foot to stop lateral movement of the torque tube foot in the direction of the first side. Wheel spacer means is also provided containing a cylindrical passage for mounting the wheel spacer means to the axle opposite the annular flange member and on the opposite side of the torque tube foot. The wheel spacer means also contains an annular portion extending radially outwardly from the wheel axis and the annular portion is positioned adjacent the second side of the torque tube foot to stop lateral movement of the torque tube foot in the direction of the second side such that the torque tube foot is restrained from moving in both axial and rotational directions relative to the axle. Vibration damage experienced to brake and landing gear components with brake assemblies of the prior design is avoided.

14 Claims, 3 Drawing Sheets

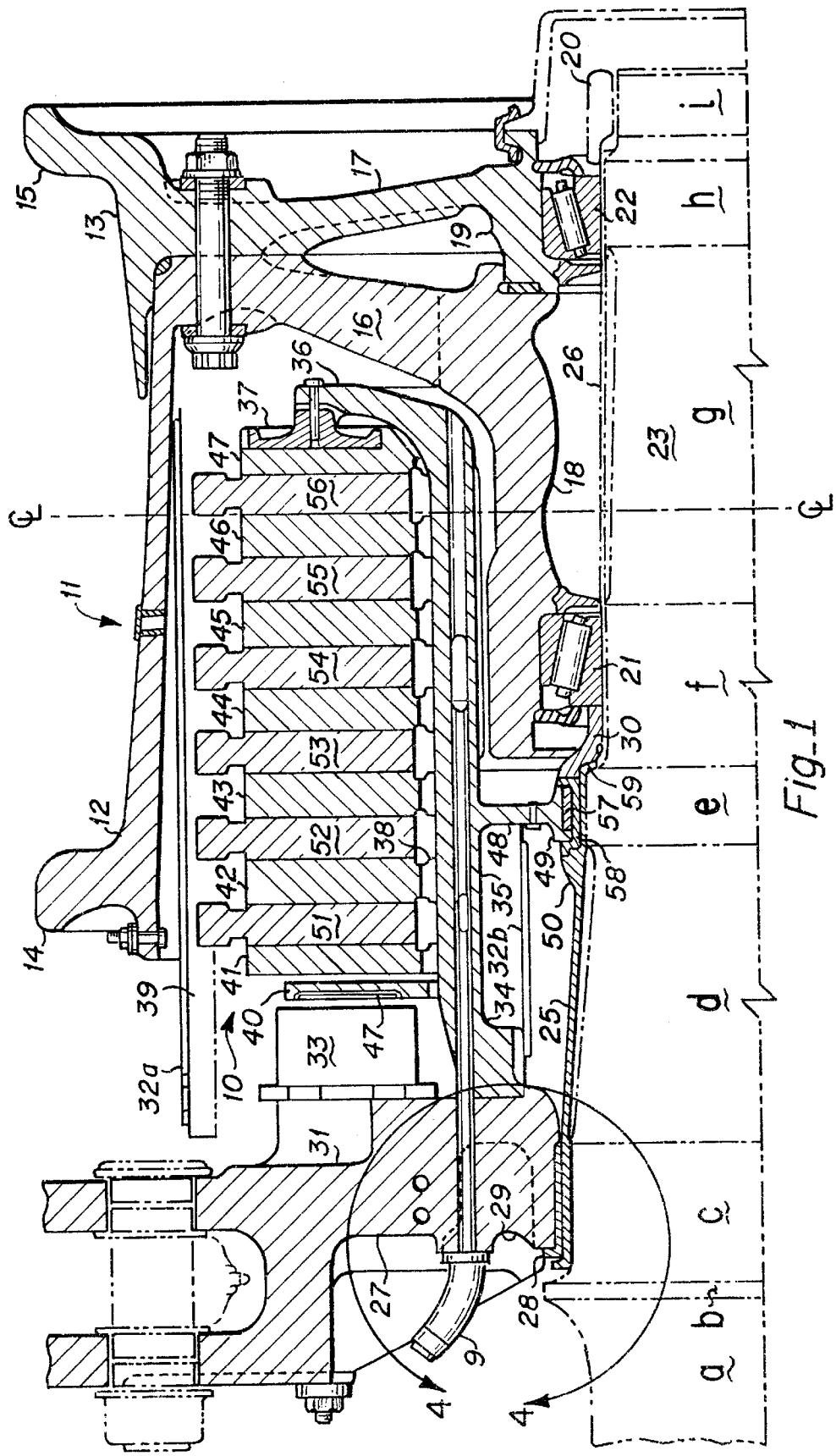
Fig_1

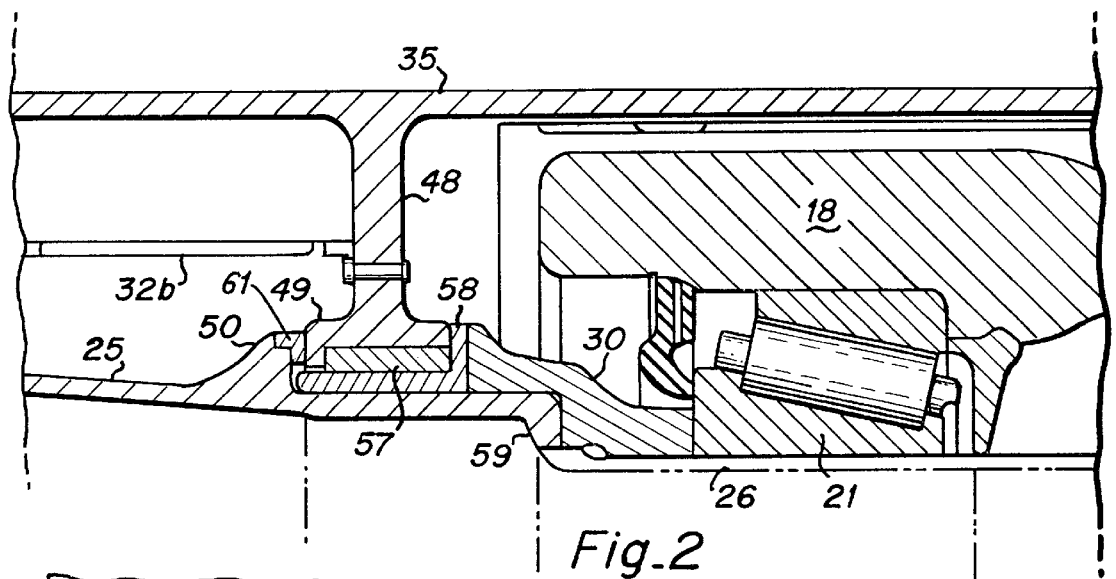
Fig_2
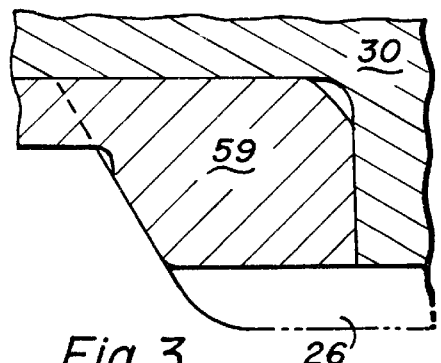
Fig_3
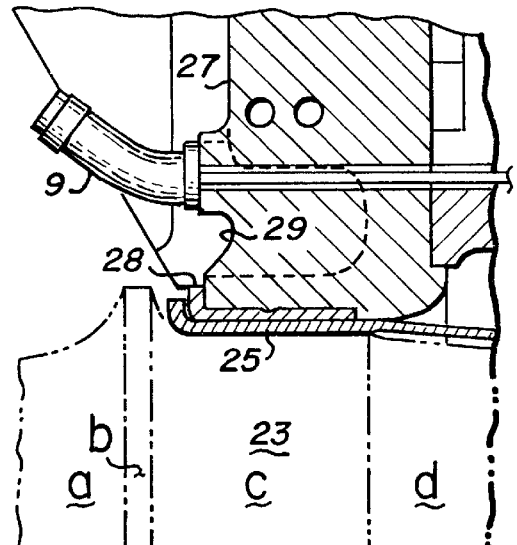
Fig_4
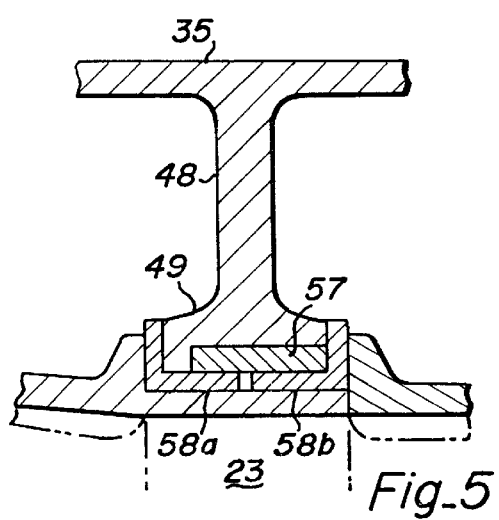
Fig_5

RESTRAINED AIRCRAFT BRAKE APPARATUS

FIELD OF THE INVENTION

This invention relates to aircraft disk braking systems and, more particularly to an improved disk braking system for aircraft that dampens vibration found associated with brakes upon brake application.

Background

Modern aircraft employ a disc braking system, whose structure is described in the literature, including the patent literature, such as U.S. Pat. Nos. 5,437,352 to Harker; 5,323,881 to Machen et al; 5,255,761 to Zaremsky; 5,205,832 to Edminsten; 5,107,968 to Delpassand; 5,062,503 to Black et al; 4,944,370 to Chambers et al; 4,383,594 to Correll et al; 4,290,505 to Kramer and 3,977,631 to Jenny.

During braking of the aircraft, the stator and rotor discs are pressed into frictional sliding contact with each other, converting the forward momentum of the aircraft into heat, bringing the aircraft to a halt. Until recent years, those discs were constructed primarily of steel material.

Carbon disc aircraft brakes were developed in recent years and became the brakes of choice for many aircraft. Carbon disc brakes offered considerable advantage. They were longer lasting and thereby reduced brake maintenance cost and they were much lighter in weight than the steel disk brakes. That substitution reduced aircraft weight, improving the aircraft's payload/range and/or reducing the aircraft's operational fuel consumption.

Enjoying the benefits of that important technological development, with experience, it was discovered that some landing gear and wheel brake assembly components became damaged and required replacement prematurely. Initially unexplainable, after lengthy investigation it was found that upon landing and initial braking of the aircraft, a very large vibration developed in the wheel brake assembly, and continued for but a small fraction of a second and that high frequency vibration caused the damage. As example, wheel heat shields became twisted, carbon disks were cracking, wheel speed transducers were failing, hydraulic piping was breaking and landing gear components were failing to the extent that brakes were becoming inoperable, creating a safety hazard.

Investigation ultimately showed that such vibration was attributed to the carbon brake assembly in an unknown vibrational mode. Although vibration was always present somewhat in steel brakes, that vibration did not produce nearly the amount of damage caused with the carbon brakes.

What existed as a relatively minor vibration problem with the prior steel disk brakes had grown to a more substantial problem, a problem faced by airframe manufacturers, brake manufacturers and air carriers worldwide. The effects of the problem range from cabin noise and passenger discomfort to structural damage and failure of landing gear and rolling assembly components. Those effects directly impact passenger safety, comfort, aircraft servicabiblity, dispatch reliability and hardware replacement costs. The foregoing circumstances provided strong incentive to seek the cure offered by the present invention.

Prior techniques of suppressing brake vibration include placement of orifices with the hydraulic passages of the brake housing; placement of dampers within the brake rotors and stators; change in composition of the brake friction material; attachment of turnbuckles to load the brake against the landing gear; and stiffening of brake structural components. Of the foregoing techniques, the only one that appeared to hold promise is the turnbuckle arrangement that loaded the brake assembly. However, turnbuckles have the operational problems of adjustment, load retention and potential yielding.

Accordingly, an object of the present invention therefore is to provide a new brake installation for aircraft brakes.

A further object of the invention is to minimize and/or eliminate significant vibration in aircraft landing gear and wheel brake assemblies upon aircraft brake application.

A still further object of the present invention is to suppress brake vibration in aircraft brake systems that employ carbon disc brakes and also in those that employ steel disc brakes, and to dampen such brake vibration with greater effectiveness than available with vibration dampening systems that employ turnbuckles to effect dampening.

An additional object of the invention is to provide a vibration suppressing brake structure that does not require the use of turnbuckles, that does not require adjustment and that does not require large axle nut torquing levels.

SUMMARY

In accordance with the foregoing objects an improved multiple disk aircraft wheel brake assembly of the type which includes disc rotors and stators in a conventional assembly and containing a torque tube and torque tube foot is improved by inclusion of a restraining means to clamp or restrict movement of the torque tube foot against lateral movement axial of the wheel axle and also serves to restrain rotational movement. The foregoing structure substantially eliminates the unwanted high frequency vibration as reflected by the reduction and/or elimination of the kinds of damage earlier experienced with carbon brakes. The foregoing should also serve to eliminate even the relatively minor damage, cabin noise and passenger discomfort experienced with steel disc brakes.

The present invention minimizes free-play. It also maximizes energy dissipation through coulomb damping. The invention introduces significantly higher levels of damping than the known prior techniques. By restraining or clamping the movement of the brake torque tube foot relative to the axle, high levels of vibration energy are found to be effectively dissipated and the impulse forces are minimized. This in turn dampens brake and rolling assembly vibration.

In accordance with an embodiment of the invention, the restraint is provided by positioning a barrier alongside the torque tube foot, the barrier being axially fixed in position. In brake installations in which the torque tube foot may move axially in both directions, a like barrier is placed on the other side of the torque tube foot as well. In accordance with another embodiment of the invention the restraining means is accomplished by a flange integrally formed on the wheel axle sleeve and positioned on one side of the torque tube foot and a wheel spacer mounted to the axle that is located on the other side of the torque tube foot. Each of those elements serves as a barrier to foot movement in the direction of such respective elements.

The foregoing and additional objects and advantages of the invention together with the structure characteristic thereof and the various embodiments thereof, which was only briefly summarized in the foregoing passages, becomes more apparent to those skilled in the art upon reading the detailed description of the various embodiments, which follows in this specification, taken together with the illustrations thereof presented in the accompanying drawings.

BRIEF DESCRIPTION OF THE DRAWINGS

In the drawings:

FIG. 1 is a fragmentary partial cross-section view of a brake assembly embodying the invention as mounted on an aircraft installation;

FIG. 2 is an enlarged partial cross section view of the torque tube foot and the associated components for restraining axial movement of the foot end found in the embodiment of FIG. 1;

FIG. 3 is an enlarged scale section view of the outboard rim member integrally formed in the outboard end of the axle tube sleeve in the embodiment of FIG. 1;

FIG. 4 is a enlarged partial section view of the inboard end of the embodiment of FIG. 1 illustrating the inboard end of an axle sleeve member;

FIG. 5 is a partial section view of an alternative torque tube foot construction that may be substituted for the corresponding element in the embodiment of FIG. 1

DETAILED DESCRIPTION OF THE PREFERRED EMBODIMENTS

Figure 6:
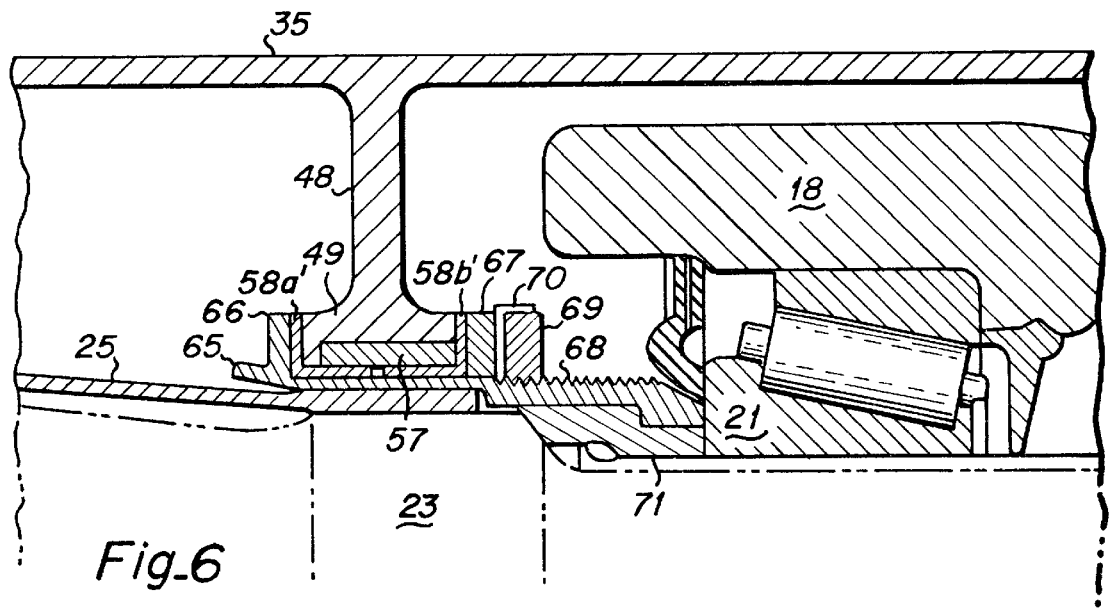
FIG. 6 is a fragmentary partial section view of an alternative embodiment of the torque tube foot restraint of the aircraft brake system.

The improvement modifies an existing aircraft brake installation and is best understood in the context of that brake system in connection with which the invention is hereafter described. Referring to the drawings, wherein like reference numerals designate like or corresponding parts throughout the several views, there is shown in FIG. 1 a friction brake mechanism 10 for use with a cylindrical wheel 11 having matching wheel sections 12 and 13. Each of the wheel sections 12 and 13 has a rim or flange, 14 and 15, web 16 and 17, and hub 18 and 19, respectively. The wheel sections 12 and 13 are fastened together by suitable bolts disposed in aligned bores within webs 16 and 17 to form an integral unit herewith to which a conventional pneumatic rubber aircraft tire, not illustrated, is mounted. The hubs 18 and 19 are supported for rotation on bearings, suitably roller bearings 21 and 22, which are mounted on a nonrotatable axle means or axle 23, having a central axis, the latter of which forms part of the aircraft's landing gear assembly.

The extending portions of axle 23 are covered by hollow removable sleeve 25, the latter described in greater detail, located to the left in the figure, and removable sleeve 26, located to the right in the figure, which are shrink fit over the axle during during assembly of the landing gear. These sleeves protect the axle, a very expensive component, from physical damage as could be caused from periodic maintenance of the wheel and/or brake assembly, which are periodically removed and replaced during the operational life of the aircraft, and from damage as could be caused by the high temperatures generated by the brakes during braking. Sleeve 25 serves an additional function in this embodiment, which is described later herein in greater detail.

As those skilled in the art recognize, when it is stated herein that one part or another is mounted to the axle, such reference is made in a generic sense, since such part may be mounted to the sleeve which overlies the axle, and/or is mounted to a bushing and/or such sleeve, as is apparent from the illustrations. But it is the axle which is the principal load bearing support.

A carrier 27, customarily referred to as a piston housing or a piston support member, is mounted on axle 23, with an intervening cylindrical bushing 28. Carrier 27 contains an inner hub or rim portion 29, a radially extending lug portion 31 and a plurality of cylinders or cylinder housings 33, distributed about the circumference of the housing and only one of which is visible in this view.

The piston housing contains a plurality of circumferentially spaced bores, not illustrated, for securing the piston housing to an annular hub 34 of a cylindrical torque tube member or torque tube 35. A plurality of bolts and nuts, not illustrated, are placed in the circumferentially spaced bores to secure the piston housing to torque tube 35.

Torque tube 35 also contains an annular and radially outwardly extending reaction plate or, as variously termed, end plate 36. The reaction plate 36 may be formed integral with torque tube 35 or may be made as a separate annular piece that is suitably connected to the torque tube 35. A plurality of circumferentially spaced pressure pads 37, generally disc shaped, is attached to the left hand side of reaction plate 36. The pressure pads 37 react the force of the back plate 47, an annular disc located to the left of the pressure pads 37. As is also conventional, torque tube 35 contains a plurality of circumferentially spaced splines 38, which are axially extending. Wheel section 12 contains a plurality of circumferentially spaced ribs or splines 39 on its inner peripheral surface. Such ribs or splines are typically cast therein during manufacture of the component or are machined to provide an integral type rib or spline for the brake assembly.

A temperature sensor 9 is connected to piston housing 27 and through a passage through the latter extends into an extended passage in the torque tube, allowing the torque tube temperature to be monitored by appropriate monitoring equipment in the aircraft.

Spline members or ribs 38 on the torque tube 35 support an axially nonrotatable pressure plate or end disc 40 and inner nonrotatable discs, 41, 42, 43, 44, 45, and 46. All of such stators contain slotted openings at circumferentially spaced locations on the inner periphery for captive engagement by the spline members 38 as is old and well known in the art. Such discs 41, 42, 43, 44, 45, and 46 constitute the stators for friction brake 10. An annular disc or back plate element 47 is suitably connected to the pressure pads 37 and acts in concert with the stator discs.

A plurality of axially spaced discs, referred to as rotors, 51, 52, 53, 54, 55, and 56 are interspaced with or, as variously termed, are interleaved between the stator discs 41 through 47. Those discs contain a plurality of circumferentially spaced openings along their outer periphery for engagement by the corresponding ribs 39 of the rotatable wheel as is old and well known in the art, thereby forming the rotor discs for the friction brake 10.

All of the nonrotatable discs, 41 through 47, and rotatable discs, 51 through 56, are fabricated from carbon, which is the present day preeminent wear-resistant material for withstanding high temperatures and is in accordance with the premise to this invention. Such carbon discs are marketed, as example, by the Aircraft Landing Systems of South Bend, Ind. The number of disc pairs in the stack may be varied as is necessary for the application involved. In one application, as example, there are six such disc pairs, as is illustrated. The respective stator discs and rotor discs that have the circumferentially spaced openings on the inner and outer periphery may accommodate reinforcing inserts, not illustrated, to provide reinforcement to the walls of such slotted openings and to enhance the life of such slots. Such reinforcing inserts are also referred to as drive clips.

The actuating mechanism for the brake includes the piston housing 27 which contains the circumferentially spaced cylinder housings 33, only one of which is illustrated, and which as shown in FIG. 1 is integral with the piston housing 27 and rim portion or hub 29. The cylinder housings 33 contain a piston cylinder and a piston head 47, the latter confronting front pressure plate 40. Since the piston cylinder is a known device, it is not necessary to further describe the details of its construction and assembly since those details are not material to the present invention.

The piston chamber is suitably connected to a hydraulic port, not illustrated, controlled by valve means, also not illustrated, in a manner old and well known in the art, whereby pressurization of chamber controls the movement of the piston or piston means. When actuated to produce braking, the piston head 47 moves axially, to the right in FIG. 1, to press against pressure plate 40 and axially move the pressure plate against the right side of the brake discs, forcing the discs into compressive frictional engagement between the piston head and the reaction plate 36 of the torque tube arm. Assuming the aircraft in which the disclosed brakes are installed has landed and is taxiing along the runway, the rotor discs are being turned by the aircraft wheels as the tires roll along the runway. The frictional engagement between the rotor and stator discs during braking helps transform the momentum that sustains the rolling movement into heat, thereby assisting to slow or bring the aircraft to a halt.

Reference is again made to the torque tube. Torque tube 35 contains a radially inwardly extending leg 48 and foot 49, referred to as the torque tube foot. Integrally formed with torque tube 35, the leg 48 and foot 49 circumferentially extend about the axis, as an annular member and cylindrical shaped member integrally joined to the annular member, respectively, with the foot's end surface or bottom supported by wheel axle 23, via intermediate heat insulators and/or bushings, as hereinafter described in greater detail. The torque tube foot provides mechanical support to the torque tube, allowing the torque tube to better support the weight and inertia of the stator discs, particularly under a dynamic vibration condition.

A ridge or flange 50, suitably integrally formed in axle sleeve 25, borders the left side of the torque tube foot 49. Wheel spacer 30 borders the right side of that foot. Spacer 30 also clamps in place on axle 23, between a radially inwardly directed annular member or rim 59 that is integrally formed on the right end of axle sleeve 25 and the inboard wheel bearing 21. The foregoing construction and the structure of the bottom of the torque tube foot, including the additional associated elements and their relationship are more clearly illustrated in the partial section view of FIG. 2 to which reference is made.

As better illustrated in this figure, torque tube leg 48, extending radially inwardly from torque tube 35, supports heat shield 32, which is fastened in position in part to the leg by rivets, and foot 49. The bottom end of torque tube foot 49 is hollowed out to create a cylindrical shaped annular cavity, leaving a narrow cylindrical rim or flange radially extending inwardly. A cylindrical heat insulator 57, suitably formed of stainless steel material, is fixed to the bottom of the foot structure, positioned within the cylindrical shaped recess formed in foot 49. Heat insulator 57 is sized in wall thickness so as to extend radially inwardly a distance slightly beyond the foot's end surface, and into abutment with a cylindrical "grommet" shaped bushing 58 that fits between the wheel axle sleeve 25 and torque tube foot 49. As illustrated, the principal cylindrical portion of bushing 58 fits under the torque tube foot and the short annular rim portion is located along a side of the torque tube foot, on the right side in the figure. The width of the bushing 58's cylindrical wall, from right to left in the figure, is slightly greater than the width of foot 49.

As shown in the figure, axle sleeve 25 contains the radially outwardly extending ridge or flange 50, integrally formed in the sleeve, and, axially spaced from that flange, the radially inwardly directed rim portion 59. A better view of the shape of the rim portion is presented in an enlarged section view in FIG. 3. The inner surface of the rim 59 is shaped and angled to abut against and generally conform to the surface of the radially inwardly tapered portion or step between portions labeled "e" and "f" in wheel axle 23. Flange 50 is shaped to define an annular cylindrical recess or rim along the outer edge on the flange's right hand side and a generally annular right side surface.

A grommet shaped bushing 61 of short height and relatively wide annular flange fits within the recess at the right side of the outer edge of flange 50 and essentially fills the space between the left side of foot 49 and sleeve flange 50, taking up any slack.

Wheel spacer 30, positioned to the right side of torque tube foot 49 contains a cylindrical central passage of sufficient diamenter to allow the spacer to fit over axle 23, including any sleeve member or spacer covering that axle. At a certain axial position along the height of that spacer's passage, the passage widens to a greater diameter, sufficient in diameter to allow the spacer to fit over the end of axle sleeve 25 and, further, defines an annular surface within the passage bordering the two different-sized cylindrical passage portions. The spacer 30 also contains a "washer shaped" or annular surface at its left end, sometimes referred to as the front end, and another annular surface at its right end, sometimes refered to as the rear end.

The washer shaped outer left hand edge of wheel spacer 30 is positioned on axle 23 contiguous to the bottom annular surface of bushing 58 and may abut that bushing or be spaced from same by a nominal manufacturing clearance. The washer shaped annular surface within wheel spacer 30's central passage abuts the outer surface of sleeve rim 59. Torque applied by the axle nut 20, illustrated in FIG. 1, creates an axial force on the various wheel members including, outboard wheel bearing 22 and therethrough to outboard wheel half 19, wheel hub 18 and therethrough to inboard wheel bearing 21, that, in turn applies a force to the rear annular surface of wheel spacer 30. Wheel spacer 30 in turn applies the force through sleeve rim 59, pressing the sleeve rim against the axle's step, clamping the sleeve rim in place. Such clamping prevents sleeve 25 from moving axially to the left in the figure and thereby also holds sleeve flange 50 in the prescribed axial position, preventing flange 50 from likewise moving or being moved further to the left. Notwithstanding that torquing force, the front edge of wheel spacer 30 is not required to exert any force upon the side of the torque tube foot 49 and/or bushing 58, and merely stands as a barrier to the foot preventing the foot from being moved axially to the right.

As is apparent from the foregoing description, the foregoing structure restricts any excursions of torque tube foot 49 to the right or to the left along the axis of axle 23, severely restraining or clamping the torque tube foot in place at the designated axial position. Should the shock of hard braking produce vibration within the torque tube 35 and in the torque tube leg 48, movement of the torque tube foot 49 is severely restrained. By so restraining the torque tube foot it was empirically found that the intermittently produced and unpredictable high frequency vibration, addressed in the preamble to this specification, and that caused so much damage in the past, was substantially reduced to minor significance or eliminated. In as much as the present computer modeling software was inadequate to explain or duplicate the prior vibration and consequent damage discovered, fortelling a lack of understanding of the cause and effect in theoretical evaluation, applicant is not ready to offer a rigorous specific theory beyond the fact that the invention functioned in practice and eliminated the vibration and the damage. It is appreciated that in operation the invention does not require adjustment, as do the prior turnbuckle techniques; it is simply assembled together.

In this embodiment, as shown in the partial section view of FIG. 4, to which brief reference may be made, the left end of sleeve 25 is spaced from the ridge in axle 23 by a very wide clearance to avoid the possibility of any physical contact therebetween, even should the sleeve lengthen due to thermal expansion. As also visible in this view, a bushing 62 is provided for the brake housing hub 29.

As illustrated in the partial section view of FIG. 4, the left edge of axle sleeve 25 is radially outwardly flared to define a peripheral rim. The left end of the sleeve and that rim is spaced from the step in axle 23, which is a characteristic of the present embodiment. Thus the left end of the sleeve is free and does not function to prevent the sleeve from axial movement to the left in this embodiment. Only the rim section 59 illustrated in FIG. 2 serves that function. As those skilled in the art appreciate, the foregoing construction contrasts with the prior art brake assembly, in which the left edge of the axle sleeve extended to and abutted the axle ridge, which served to prevent such leftward direction axial sleeve movement.

The present invention is employed with a landing gear wheel axle 23 that contains a somewhat complex geometry, which thereby governs the geometry of sleeve 25 employed in this embodiment, and serves to advantage in the construction of the vibration dampening elements to this embodiment. As illustrated in FIG. 1 to which reference is again made, the landing gear wheel axle contains various portions coaxially aligned, including a first portion "a" that is of a cylindrical geometry of a first diameter D1; a second portion "b", next to the first, defining a cylindrical flange of a second diameter D2, where D2>D1, which extends radially outwardly beyond the radial extent of the first portion by a predetermined amount; a third portion "c", located next to the second, having a cylindrical geometry of a third diameter D3, where D3<D2, providing a first annular tapered step between the second and third portions; followed by a fourth portion "d", that has the geometry of a right cone of predetermined height, that tapers from a diameter, D3, at one end, the same diameter as the preceding portion, to a lesser diameter D4 at the opposite end; a fifth portion "e" having a cylindrical geometry of an increased diameter D5, where D5>D4, defining a upwardly sloping step between the fourth and fifth axle portions; a sixth portion "f" having a cylindrical geometry of a reduced diameter D6, where D6<D5, providing a tapered annular step between the fifth and sixth portions; a seventh portion "g", having a right conical section geometry that tapers slightly from a diameter of D6 to a lesser diameter D7, where D7<D6; an eighth cylindrical portion "h", of a diameter D8=D6; and the final or ninth portion "i", having a cylindrical geometry of reduced diameter D9, where D9<D8. The ninth portion contains the threaded end for receiving the axle nut 20. Advantageously, thus, the embodiment allows a more simple retro-fit application of the invention to existing aircraft.

The foregoing structure is easily integrated and assembled. Axle sleeves 25 and 26 are shrink fit to the axle as part of the normal manufacture of a landing gear assembly. The brake is assembled by sliding the interleaved rotor and stator disks onto the torque tube, the slots in the stator disks fitting into the corresponding splines on the torque tube. The pressure plate is next slid onto the torque tube. Then the piston housing assembly is bolted to the torque tube to form a complete brake assembly.

Next the wheel spacer 30 is placed over the axle and adjacent the torque tube foot 49. Wheel assembly 11 is then slid onto the sleeved axle, the splines in the rotor disks lining up with the splines in the outer wheel web 12. Then the axle nut 20 is threaded onto the axle and tightened to the appropriate torque and safely locked into place.

The wheel nut applies an axial force to the outboard wheel bearing 22, the wheel members 18 and 19, and the inboard wheel bearing assembly 21. Through the left hand surface of inboard wheel bearing 21, the axial force is applied to wheel spacer 30 and that spacer in turn applies force to the portion of the axle sleeve 59 to clamp the sleeve to the axle at that location. Since flange 50 is integral with the sleeve member, that flange is clamped in place to the left side of the torque tube foot 49.

Thus on the right side of the torque tube foot, wheel spacer 30 serves to limit any excursion of the tube foot to the right, while on the left side of the tube foot, flange 50 limits any axial excursion of that foot end to the left in the figure to zero up to the amount of any manufacturing clearance, nominally 0.000 inches plus or minus 0.003 inches. Effectively, the tube foot end is clamped in axial position or as otherwise stated, is restrained. Any forces created by flexure in the torque tube leg, supporting the foot, cannot swing the foot end in an axial direction.

It is appreciated that because of the minimal clearances between the torque tube foot and adjacent restraints, the foregoing structure also serves to inhibit or restrain as well any rotational movement of the torque tube foot. Any temporary distortion of the torque tube as might be caused by a force as would induce high frequency vibration could produce a rotational force in addition to the axial force, creating a binding or frictional effect that inhibits rotational movement.

As those skilled in the art appreciate from the foregoing description, torque tube foot 49 and associated bushings are not required to be of the configuration illustrated, but may be changed to alternative forms without departing from the invention. As example, as illustrated in FIG. 5, two short height grommet shaped bushings, 58a and 58b, identical in structure, may be placed front to front, leaving a slight gap between, replacing the bushing 58 illustrated in FIG. 2.

Moreover, it is not necessary to employ the rims and flange 50 as integral with sleeve 25, in order to provide the restraints on the torque tube foot. In the alternative embodiment of FIG. 6 a generally cylindrical shaped member 65 contains a radially outwardly extending flange 66 to the left side of torque tube foot 49, abutting the annular base of bushing 58a', which in turn abuts the left side of the foot. At the right side a washer shaped spacer 67 fits over member 65 and an annular shaped nut 69, carrying a key washer 70 is threaded onto the threads 68 on the outer surface of member 65, and tightened, firmly positioning spacer 67 in fixed axial position against the right side of the torque tube foot. Key washer 70 has a key which slides onto a slot in the threads 68 preventing any rotation of the key washer. After nut 69 is tightened down, tabs on the key washer are bent down onto the nut, preventing the nut from backing off. Member 65 is fitted over a spacer 71 and locked axially by a groove in the spacer and the spacer in turn is clamped against the step or tapered portion of wheel axle 23.

Figure 7:
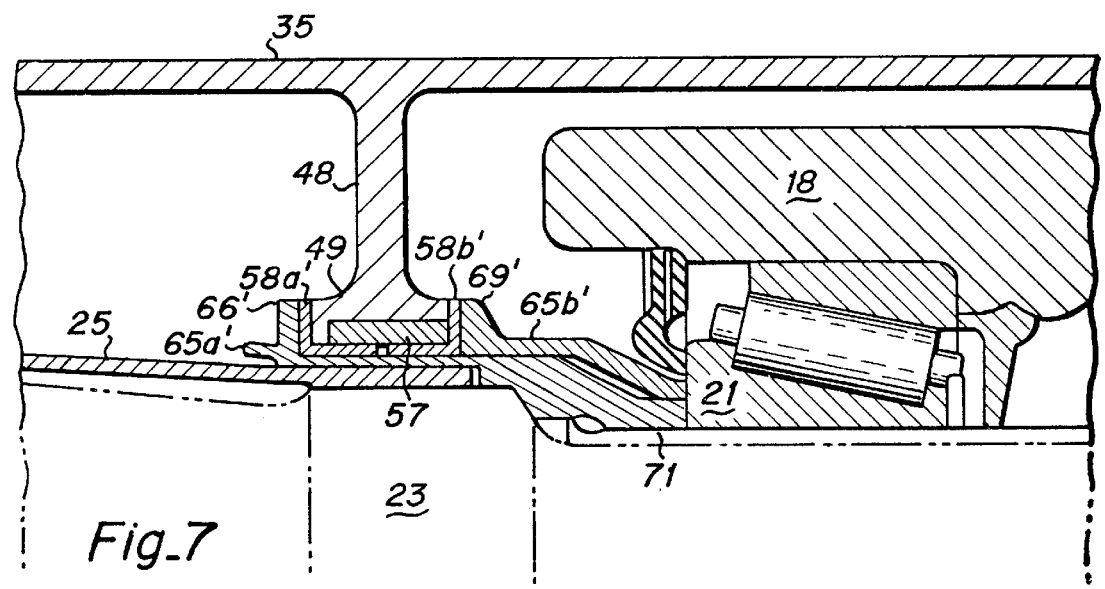
FIG. 7 is a fragmentary partial section view of a further alternative embodiment of the torque tube foot restraint of the aircraft brake system.

Still another alternative is presented in FIG. 7 which contains all of the same elements for clamping the torque tube foot in fixed axial position as found in FIG. 6, excepting that no threads are required. In this embodiment member 65 of FIG. 6 is formed in two parts as 65a' and 65b' and the latter contains the flange like radially outwardly extending annular portion 69' that was served by lock nut 69, key washer 70 and spacer 58b' in the embodiment of FIG. 6. Still other variations of the torque tube foot clamping structure, become apparent to those skilled in the art.

As recognized by those skilled in the art, while the foregoing structure is particularly useful with carbon disc brakes in connection with which the invention has been described, the invention is not restricted thereto, and may be applied to like benefit in aircraft brake installations that employ steel brakes. It is believed that the foregoing description of the preferred embodiments of the invention is sufficient in detail to enable one skilled in the art to make and use the invention. However, it is expressly understood that the detail of the elements presented for the foregoing purposes is not intended to limit the scope of the invention, in as much as equivalents to those elements and other modifications thereof, all of which come within the scope of the invention, will become apparent to those skilled in the art upon reading this specification. Thus the invention is to be broadly construed within the full scope of the appended claims.

What is claimed is:

1. An aircraft brake assembly for use with an aircraft landing gear structure, said assembly comprising:
    a wheel axle;
    a braking actuator mounted on said wheel axle;
    a plurality of brake discs surrounding said wheel axle and being in operable communication with said braking actuator such that said braking actuator forces said brake discs into compressive frictional engagement with each other for braking the aircraft; and
    a torque tube having an inboard end, an outboard end and a generally cylindrical wall therebetween for supporting alternate ones of said plurality of brake discs, said inboard end having an annular hub for connecting said torque tube to said wheel axle, and wherein said torque tube further includes,
    a torque tube leg, extending radially inwardly from said cylindrical wall and being spaced from said annular hub toward the outboard end of said torque tube, and
    an axially and rotationally restrained torque tube foot located at the radially inward end of said torque tube leg so as to help support said torque tube on said wheel axle, said torque tube foot being restrained both axially and rotationally relative to said wheel axle so as to attenuate undesirable vibration produced by aircraft braking.

2. An aircraft brake assembly as defined in claim 1, further comprising an annular flange member on said wheel axle positioned adjacent a first side of said torque tube foot for stopping lateral movement of said torque tube foot in the direction of said first side.

3. An aircraft brake assembly as defined in claim 1, further comprising a wheel spacer on said wheel axle positioned adjacent a second side of said torque tube foot and having an annular flange for stopping lateral movement of said torque tube foot in the direction of said second side.

4. An aircraft brake assembly as defined in claim 1, further comprising:
    an annular flange member on said wheel axle positioned adjacent a first side of said torque tube foot for stopping lateral movement of said torque tube foot in the direction of said first side; and
    a wheel spacer on said wheel axle positioned adjacent a second side of said torque tube foot and having an annular flange for stopping lateral movement of said torque tube foot in the direction of said second side,
    said annular flange member and said wheel spacer jointly restraining movement of said torque tube foot axially and rotationally relative to said wheel axle.

5. An aircraft brake assembly as defined in claim 1, further comprising a heat insulator located adjacent said wheel axle and positioned within an annular cavity defined at least partially by said torque tube foot.

6. An aircraft brake assembly as defined in claim 5, further comprising a foot bushing located between said wheel axle and said torque tube foot, said foot bushing having a grommet shape and defining at least part of the annular cavity in which said heat insulator is positioned.

7. An aircraft brake assembly for use with an aircraft landing gear structure, said assembly comprising:
    a wheel axle;
    an axle sleeve slidably connected to, and axially removable from, said wheel axle;
    a braking actuator mounted on said wheel axle;
    a plurality of brake discs surrounding said wheel axle and being in operable communication with said braking actuator such that said braking actuator forces said brake discs into compressive frictional engagement with each other for braking the aircraft; and
    a torque tube having an inboard end, an outboard end and a generally cylindrical wall therebetween for supporting alternate ones of said plurality of brake discs, said inboard end having an annular hub for connecting said torque tube to said wheel axle, and wherein said torque tube further includes,
    a torque tube leg, extending radially inwardly from said cylindrical wall and being spaced from said annular hub toward the outboard end of said torque tube, and
    an axially and rotationally restrained torque tube foot located at the radially inward end of said torque tube leg so as to help support said torque tube on said wheel axle, said torque tube foot being restrained both axially and rotationally relative to said wheel axle so as to attenuate undesirable vibration produced by aircraft braking.

8. An aircraft brake assembly as defined in claim 7, further comprising an annular flange member on said axle sleeve positioned adjacent a first side of said torque tube foot for stopping lateral movement of said torque tube foot in the direction of said first side.

9. An aircraft brake assembly as defined in claim 8, wherein said annular flange member is formed integrally with said axle sleeve.

10. An aircraft brake assembly as defined in claim 7, further comprising a wheel spacer positioned adjacent said axle sleeve and adjacent a second side of said torque tube foot and having an annular flange for stopping lateral movement of said torque tube foot in the direction of said second side.

11. An aircraft brake assembly as defined in claim 10 wherein said wheel spacer defines an annular stepped surface adjacent said second side of said torque tube foot, said annular stepped surface preventing axial force applied to said wheel spacer opposite said second side from varying axial pressure applied to said second side of said torque tube foot.

12. An aircraft brake assembly as defined in claim 7, further comprising:

an annular flange member on said axle sleeve positioned adjacent a first side of said torque tube foot for stopping lateral movement of said torque tube foot in the direction of said first side; and a wheel spacer on said axle sleeve positioned adjacent a second side of said torque tube foot and having an annular flange for stopping lateral movement of said torque tube foot in the direction of said second side, said annular flange member and said wheel spacer jointly restraining movement of said torque tube foot axially and rotationally relative to said wheel axle.

13. An aircraft brake assembly as defined in claim 7, further comprising a heat insulator located adjacent said wheel axle and positioned within an annular cavity defined at least partially by said torque tube foot.

14. An aircraft brake assembly as defined in claim 13, further comprising a foot bushing between said axle sleeve and said torque tube foot, said foot bushing having a grommet shape and defining at least part of the annular cavity in which said heat insulator is positioned.

\* \* \* \* \*